June 9, 1931.　　　　B. H. SMITH　　　　1,809,254
HANDLE FOR FORKS AND LIKE IMPLEMENTS
Filed May 20, 1929
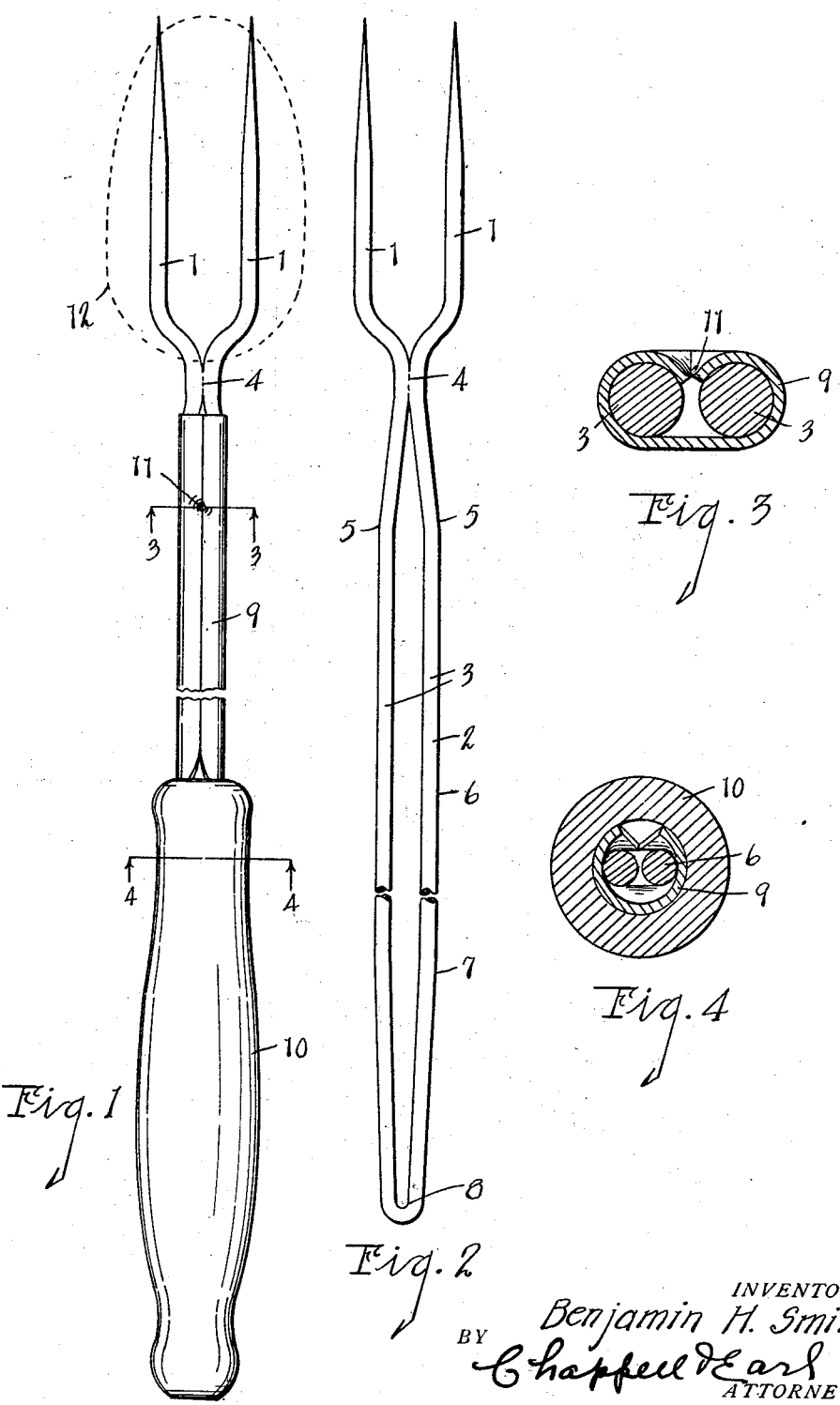
INVENTOR
Benjamin H. Smith
BY Chappell & Earl
ATTORNEYS Patented June 9, 1931

1,809,254

UNITED STATES PATENT OFFICE

BENJAMIN H. SMITH, OF NILES, MICHIGAN, ASSIGNOR TO MICHIGAN WIRE GOODS COMPANY, OF NILES, MICHIGAN

HANDLE FOR FORKS AND LIKE IMPLEMENTS

Application filed May 20, 1929. Serial No. 364,512.

The main object of this invention is to provide a collapsible fork, spoon, broiler or like implement for use in kitchens, camps and the like which may be compactly collapsed and extended to any desired length within its scope of adjustment and when extended is strong and rigid and not likely to be accidently collapsed.

A further object is to provide a structure having these advantages which is very economical and at the same time very durable.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary view of my improved implement as embodied in a fork in collapsed position, a portion of the handle being broken away, a spoon being indicated by dotted lines.

Fig. 2 is a fragmentary view of my improvements as embodied in a fork showing the integral shank and tines.

Fig. 3 is an enlarged transverse section on line 3—3 of Fig. 1.

Fig. 4 is an enlarged detail section on line 4—4 of Fig. 1.

Referring to the drawings, the implement 1 illustrated by full lines herein and its shank 2 are formed of a single piece of wire folded upon itself, the shank being in the form of a loop, its members 3 being substantially spaced to provide lateral resiliency.

The members of the shank are secured together at 4 at the base of the tines preferably by abrazing or welding and diverge upwardly for a substantial distance to a point 5 from which position they have a substantial parallel portion 6 extending to a point opposite 7 from which they converge to the bight 8.

The handle 9 is preferably formed of a piece of sheet metal folded upon itself to provide a flattened tube. The outer end of this tube is inserted in a hollow hand-piece 10 which constitutes an extension for the handle and also prevents spreading or opening of the joint. The shank of the implement is inserted into the handle under compression so that it is frictionally held in its adjusted positions; that is, it may be telescoped within the handle, or fully extended, or partially extended as desired and is held in any of its adjusted positions.

To prevent complete withdrawal of the shank, the handle is indented at 11 providing a stop coacting with the bight of the handle in limiting its outward movement.

In Fig. 1, I illustrate by dotted lines a spoon 12. It will be understood that the shank may be affixed to other implements than spoons and forks.

It will be further understood that no attempt has been made in the accompanying drawings to maintain relative proportion of the parts. The non-circular character of the shank and handle prevent rotative movement and present a substantial and attractive appearance.

Having thus described my invention, what I claim as new and desire to secure by Letters Patent, is:

1. In an implement of the class described, the combination of a tubular handle of flattened cross section providing a socket of flattened cross section and provided with a hollow handpiece at its outer end constituting an extension therefor, and an implement formed of wire folded upon itself with its members spaced and conformed to provide a laterally resilient loop-like shank of an external cross section corresponding to that of the handle and a pair of tines, the members of the shank being secured together at the base of the tines and diverging outwardly therefrom for a substantial distance so that they are yieldingly supported in spaced relation, said shank being telescopingly arranged within said handle with its members under tension whereby it is frictionally held in its adjusted positions in the handle and is supported against rotative movement therein.

2. In an implement of the class described, the combination of a tubular handle of flattened cross section, and an implement provided with a loop-like shank formed of wire folded upon itself with its members in spaced relation and secured together at their outer ends so that they are yieldingly supported in spaced relation, said shank being telescopingly arranged within said handle with its members under tension whereby it is frictionally held in its adjusted positions, the handle being indented between the members of the shank providing a stop coacting with the bight of the shank limiting its outward extension.

3. In an implement of the class described, the combination of a tubular handle of flattened cross section providing a socket of flattened cross section, and an implement provided with a loop-like shank of flattened cross section formed of wire folded upon itself with its members in spaced relation and secured together at their outer ends so that they are yieldingly supported in spaced relation, said shank being telescopingly arranged within said handle with its members under tension whereby it is frictionally held in its adjusted positions and is supported against rotative movement in the handle.

In witness whereof I have hereunto set my hand.

BENJAMIN H. SMITH.